United States Patent
Seyberth et al.

(10) Patent No.: US 11,130,491 B2
(45) Date of Patent: Sep. 28, 2021

(54) PROTECTION DEVICE FOR A DRIVETRAIN OF A MOTOR VEHICLE

(71) Applicant: AUDI AG, Ingolstadt (DE)

(72) Inventors: Philipp Seyberth, Titting (DE); Michael Schneider, Stammham (DE)

(73) Assignee: AUDI AG, Ingolstadt (DE)

( * ) Notice: Subject to any disclaimer, the term of this patent is extended or adjusted under 35 U.S.C. 154(b) by 199 days.

(21) Appl. No.: 16/077,157

(22) PCT Filed: Feb. 17, 2017

(86) PCT No.: PCT/EP2017/053611
§ 371 (c)(1),
(2) Date: Aug. 10, 2018

(87) PCT Pub. No.: WO2017/144362
PCT Pub. Date: Aug. 31, 2017

(65) Prior Publication Data
US 2019/0039620 A1 Feb. 7, 2019

(30) Foreign Application Priority Data
Feb. 22, 2016 (DE) ...................... 10 2016 202 693.3

(51) Int. Cl.
*B60W 30/18* (2012.01)
*B60T 7/12* (2006.01)
(Continued)

(52) U.S. Cl.
CPC ......... *B60W 30/18118* (2013.01); *B60T 7/12* (2013.01); *B60T 8/245* (2013.01);
(Continued)

(58) Field of Classification Search
CPC ................................................ B60W 30/18118
(Continued)

(56) References Cited

U.S. PATENT DOCUMENTS 5,323,667 A * 6/1994 Tweed .................. B60W 30/18
477/107
5,408,411 A * 4/1995 Nakamura ............... B62D 6/00
701/48

(Continued)

FOREIGN PATENT DOCUMENTS

CN 1852822 A 10/2006
CN 103889793 A 6/2014
(Continued)

OTHER PUBLICATIONS

Google Machine Translation of DE19849494C1 to Boll that published in 2009.*

(Continued)

*Primary Examiner* — Jean Paul Cass
(74) *Attorney, Agent, or Firm* — Maier & Maier, PLLC

(57) ABSTRACT

A protection device for a drivetrain of a motor vehicle having an engine and an automatic transmission, with at least one hydraulic converter. In order to protect the drivetrain, the protection device has a sensor device and a control device. The sensor device is designed to detect a rolling movement of the motor vehicle counter to the selected direction of travel of an engaged gearspeed of the automatic transmission, and the control device is designed to control a brake system of the motor vehicle as a function of the detected rolling movement, in order to limit a rolling speed of the motor vehicle counter to the selected direction of travel to a maximum speed.

12 Claims, 1 Drawing Sheet

(51) Int. Cl.
  *B60T 8/24* (2006.01)
  *F16H 41/00* (2006.01)
(52) U.S. Cl.
  CPC .. *B60T 2201/06* (2013.01); *B60W 2510/1005* (2013.01); *B60W 2520/06* (2013.01); *B60W 2710/18* (2013.01); *F16H 41/00* (2013.01)
(58) Field of Classification Search
  USPC ............................................................ 701/70
  See application file for complete search history.

(56) References Cited

U.S. PATENT DOCUMENTS

| | | | | |
|---|---|---|---|---|
| 5,583,766 | A * | 12/1996 | Birchenough | B60W 10/06 477/107 |
| 6,065,558 | A * | 5/2000 | Wielenga | B60G 3/18 180/197 |
| 6,263,261 | B1 * | 7/2001 | Brown | B60T 7/12 303/189 |
| 6,278,930 | B1 * | 8/2001 | Yamada | B60T 8/17554 303/133 |
| 6,315,373 | B1 * | 11/2001 | Yamada | B60T 8/1755 180/282 |
| 6,324,446 | B1 * | 11/2001 | Brown | B60W 10/184 701/1 |
| 6,332,104 | B1 * | 12/2001 | Brown | B60R 21/013 180/282 |
| 6,397,127 | B1 * | 5/2002 | Meyers | B60G 17/0162 340/431 |
| 6,425,585 | B1 * | 7/2002 | Schuelke | B60G 17/0162 280/124.106 |
| 6,428,118 | B1 * | 8/2002 | Blosch | B60T 8/17554 303/142 |
| 6,498,976 | B1 * | 12/2002 | Ehlbeck | B60G 17/0162 701/70 |
| 6,529,811 | B2 * | 3/2003 | Watson | B60R 21/013 701/1 |
| 6,631,317 | B2 * | 10/2003 | Lu | B60G 17/016 340/440 |
| 6,684,140 | B2 * | 1/2004 | Lu | B60G 17/016 701/37 |
| 6,718,248 | B2 * | 4/2004 | Lu | B62D 7/159 701/70 |
| 6,843,538 | B1 * | 1/2005 | Nagae | B60T 8/17554 280/5.51 |
| 8,972,162 | B1 | 3/2015 | Koebler et al. | |
| 9,005,082 | B2 * | 4/2015 | Okamura | B60W 30/18118 477/186 |
| 2001/0049576 | A1 * | 12/2001 | Wheeler | B60W 30/18 701/67 |
| 2005/0057090 | A1 | 3/2005 | Kinser et al. | |
| 2005/0075775 | A1 | 4/2005 | Carlson et al. | |
| 2007/0010927 | A1 * | 1/2007 | Rowley | B60W 10/02 701/51 |
| 2007/0222289 | A1 | 9/2007 | Fukuda et al. | |
| 2009/0127012 | A1 | 5/2009 | Leibbrandt et al. | |
| 2011/0166745 | A1 * | 7/2011 | Tiwari | F02N 11/101 701/29.2 |
| 2013/0057053 | A1 | 3/2013 | Staub et al. | |
| 2013/0085036 | A1 * | 4/2013 | Anderson | B60W 30/18172 477/110 |
| 2014/0095048 | A1 | 4/2014 | Peterson | |
| 2014/0287873 | A1 | 9/2014 | Okamura et al. | |
| 2014/0309901 | A1 | 10/2014 | Schneider et al. | |
| 2015/0031504 | A1 | 1/2015 | Reynolds et al. | |
| 2015/0158492 | A1 | 6/2015 | Bulgrien et al. | |
| 2015/0176701 | A1 * | 6/2015 | Wilke | B60W 10/02 701/54 |
| 2015/0197250 | A1 | 7/2015 | Heisel | |

FOREIGN PATENT DOCUMENTS

| | | |
|---|---|---|
| CN | 103889805 A | 6/2014 |
| CN | 104039625 A | 9/2014 |
| CN | 104684783 A | 6/2015 |
| CN | 104773174 A | 7/2015 |
| CN | 105128837 A | 12/2015 |
| DE | 19849494 C1 | 3/2000 |
| DE | 69610280 T2 | 1/2001 |
| DE | 60118875 T2 | 9/2006 |
| DE | 102005021924 A1 | 11/2006 |
| DE | 102009001799 A1 | 9/2010 |
| DE | 102011101997 A1 | 11/2012 |
| DE | 102011087016 A1 | 5/2013 |
| JP | 2001280456 A * | 3/2000 |
| WO | 2015/018611 A1 | 2/2015 |
| WO | 2015/040131 A1 | 3/2015 |

OTHER PUBLICATIONS

Google Machine Translation of Japanese Patent Pub. No. JP3519339B2 that was filed in 2000 and published in 2001.*
International Preliminary Report on Patentability dated Sep. 7, 2018 in corresponding International Application No. PCT/EP2017/053611; 6 pages.
Office Action dated Mar. 21, 2019 in corresponding German Application No. 10 2016 202 693.3; including partial machine-generated English language translation; 9 pages.
Office Action dated Sep. 22, 2020 in corresponding Chinese Application No. 201780012439.8; 10 pages including human generated English-language summary.
International Search Report and Written Opinion of the International Search Authority dated May 4, 2017 of corresponding International application No. PCT/EP2017/053611; 16 pgs.
Chinese Office Action dated Apr. 12, 2021, in connection with corresponding CN Application No. 201780012439.8 (13 pp., including machine-generated English translation).

* cited by examiner

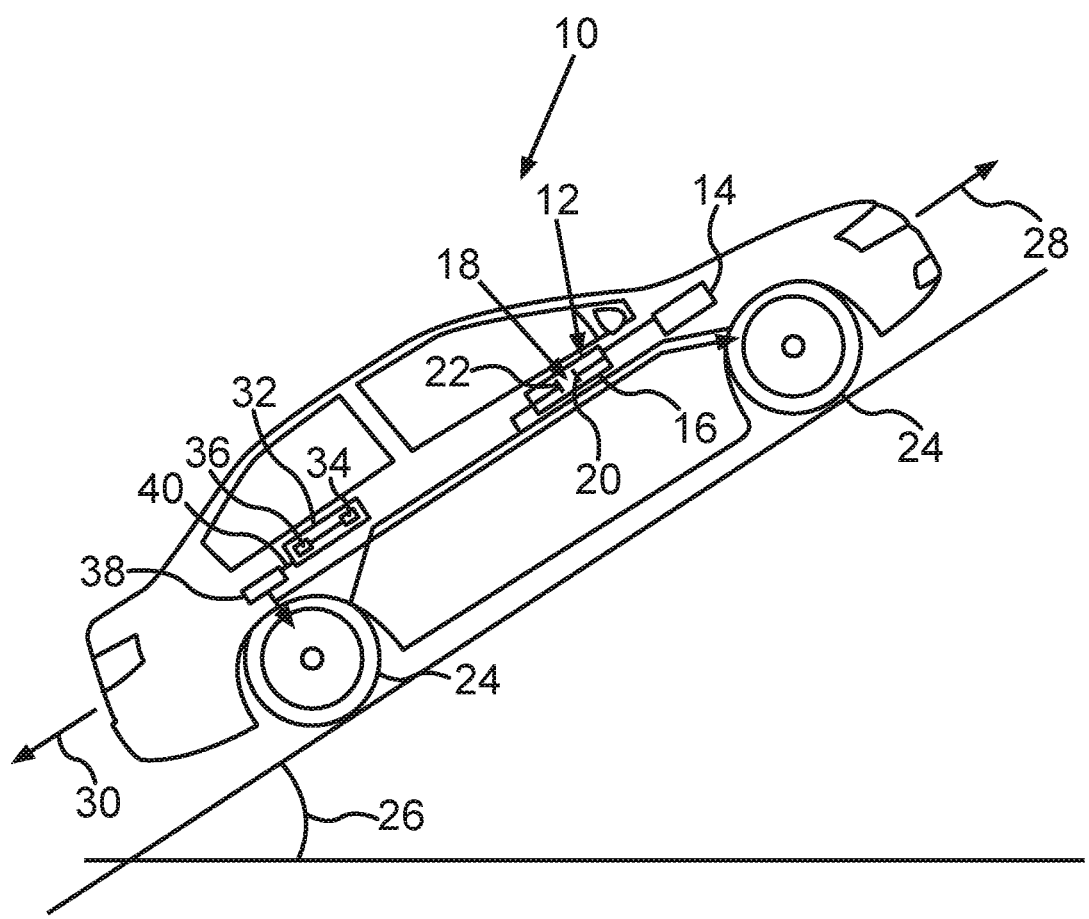

PROTECTION DEVICE FOR A DRIVETRAIN OF A MOTOR VEHICLE

FIELD

The invention relates to a protection device for a drivetrain of a motor vehicle. Furthermore, the invention relates to a motor vehicle as well as a method for operating a motor.

BACKGROUND

Many modern motor vehicles are outfitted with an automatic transmission by means of which a driving force from an engine of the motor vehicle is transferred to respective driven wheels of the motor vehicle. The automatic transmission automatically adapts a transmission stage to a gas pedal setting, to a speed of travel, and/or an engine rotational speed of the motor vehicle. Often, automatic transmissions comprise a hydraulic converter. This hydraulic converter may serve, for example, to reduce the respective loads on the drivetrain when starting from a standstill.

However, in such an automatic transmission there can occur damage to the drivetrain and/or an unwanted behavior of the motor vehicle due to a rolling counter to a selected direction of travel. For example, in a selected direction of travel in the forward direction—this gear is often designated as "D"—a motor vehicle may begin to roll backward, given a sufficient slope of the ground underneath it, despite a static torque acting on account of an idle speed. Such a backward movement may be conveyed by way of the wheels of the motor vehicle to the drivetrain. In this way, for example, damage may occur to the transmission and/or an unwanted shutoff of the engine may occur, also called a killing of the engine.

It is known from US 2005/0075775 A1 how to detect a backward rolling movement of a motor vehicle counter to an engaged forward gear. When a minimum speed is exceeded, a clutch is activated in the transmission to prevent the back rolling. For this purpose, a standing engine rotational speed of the motor vehicle is increased. In this way, the motor vehicle is brought to a halt. However, the drawback is the load produced in this way on the transmission and the additional fuel consumption due to the increasing of the standing engine rotational speed.

From DE 601 18 875 D2 there is known a control system of a hill-hold device for a motor vehicle. It is provided here to block the respective wheels of a motor vehicle standing on a slope by engaging a bypass clutch. In this case as well, therefore, a portion of the transmission is loaded in order to hold the motor vehicle. At the same time, this bypass clutch must first be disengaged in order to move forward again. This may result in a delay in the starting process.

From DE 696 10 280 T2 there is known a control mechanism for an automatic transmission in order to hold a motor vehicle at standstill on a slope. For this purpose, a portion of the transmission is blocked by means of a brake in a motor vehicle halted on a slope. Thus, once again the transmission is loaded here for the holding of the motor vehicle.

SUMMARY

An object of the present invention is to create a protection device for a motor vehicle by means of which a drivetrain of the motor vehicle can be protected. Furthermore, another object of the present invention is to create a motor vehicle whose drivetrain is especially well protected against damage. In addition, another object of the present invention is to create a method for operating a motor vehicle in which the loading of the drivetrain is especially slight.

These objects are achieved according to the invention by the subject matter of the independent patent claims. Advantageous embodiments with expedient enhancements of the invention are indicated in the respective dependent claims, where advantageous embodiments of a particular device and method are to be seen as advantageous embodiments of another particular device and method, and vice versa.

A first aspect of the invention relates to a protection device for a drivetrain of a motor vehicle having an engine and an automatic transmission, which comprises at least one hydraulic converter. According to the invention, it is provided that the protection device comprises a sensor device and a control device, wherein the sensor device is designed to detect a rolling movement of the motor vehicle counter to the selected direction of travel of an engaged gearspeed of the automatic transmission, and wherein the control device is designed to control a brake system of the motor vehicle as a function of the detected rolling movement, in order to limit a rolling speed of the motor vehicle counter to the selected direction of travel to a maximum speed. In this way, it is possible to limit a rolling movement of the motor vehicle counter to the selected direction of travel on a slope to such a rolling speed that any forces introduced by the wheels of the motor vehicle into the drivetrain are so slight that no damage occurs to the drivetrain. At the same time, an unwanted behavior of the drivetrain can be especially well prevented in this way. For example, the rolling movement can be limited to a speed at which the forces introduced into the drivetrain do not result in an unwanted shutoff or killing of the engine.

The hydraulic converter, for example, may also be called a hydrodynamic converter. The engine of the motor vehicle may be designed, for example, as an internal combustion engine or an e-machine. In the simplest case, the maximum speed may be a firmly predetermined maximum speed. However, the maximum speed may also be adapted to particular parameters, for example, to the gearspeed engaged in the automatic transmission. For example, a higher maximum speed may be permitted if the motor vehicle is rolling backward with a forward gear engaged, than when it is rolling forward with a rear gear engaged. In both cases, the drivetrain is under equal loading.

The brake system, for example, comprises any normal driving brakes by means of which a rotational movement of the respective wheels of the motor vehicle can be braked. For example, particular brakes of the brake system may be designed as disk brakes or drum brakes, which are arranged on the undercarriage of the motor vehicle.

The invention is based on the knowledge that special hydraulic effects may occur in the hydraulic converter when the rolling speed counter to the selected direction of travel exceeds a certain speed. Thus there may occur a sudden rise in the torque transmitted from the wheels to transmission parts hooked up behind the hydraulic converter and downstream to the direction of force transmission. In particular, a large force may suddenly act on the engine counter to its direction of rotation. Due to this sudden rise in force, parts of the transmission and/or engine may become damaged. For example, due to this sudden rise in force the engine may be rotated counter to its normal direction of operation, which may result in damage to moving parts.

Furthermore, the invention is based on the understanding that a standstill of the motor vehicle can only be detected with high expenditure by measurement techniques. On the other hand, a sensor system required to detect a rolling movement, especially one counter to the selected direction of travel, is already usually integrated in a motor vehicle for other purposes. However, on the other hand, a sensor system that can reliably detect a speed of zero is very expensive and often not yet available. Moreover, a regulating system by means of which the motor vehicle can be held at standstill is costly.

Likewise, the invention is based on the understanding that a motor vehicle is often not brought by the driver completely to standstill on a slope, in which case, for example, traditional hill-hold systems can hold the motor vehicle in place. For example, drivers also often let their motor vehicles roll out on a slope, which may then result quickly in a backward rolling movement counter to the selected direction of travel. In this case, however, there is no longer an automatic activating of a hill-hold system and/or a hill-start assist system.

Furthermore, the protection device is also advantageous in that the brake system of the motor vehicle is utilized to limit the maximum speed. Thus, the limiting of the rolling movement to the maximum speed does not cause an additional load on the transmission. The brake system is a unit that is specifically designed to reduce or limit the speed of a motor vehicle. Accordingly, this causes only slight wear and tear, and furthermore any wearing parts of the brake system can be easily and inexpensively replaced. On the other hand, if parts of the transmission are used to limit the speed, an additional wear will be caused. It is complicated and expensive to replace any worn parts of the transmission as compared to replacing of parts of the brake system. Furthermore, a brake system can respond much faster than, for example, any clutch elements for the blocking of an automatic transmission. The protection device thus allows the driver a particularly fast restart when the rolling movement counter to the selected direction of travel is limited to the maximum speed. Moreover, it is not necessary to provide additional elements in the brake system to offer this functionality. On the other hand, additional moving parts are needed to block an automatic transmission or the rolling movement of the motor vehicle counter to the selected direction of travel by means of the transmission, parts such as special clutches, which makes the transmission more expensive and heavier.

In another advantageous embodiment of the protection device it is provided that the control device is designed as part of an engine controller of the motor vehicle. The engine controller usually already has the necessary hardware to generate the control commands needed to operate the protection device. In particular, other methods are usually already implemented in the engine controller of the motor vehicle for protecting a drivetrain. Hence, the engine controller can provide the necessary operating safety and performance capability for controlling the protection device with no further modification.

In another advantageous embodiment of the protection device according to the invention, it is provided that the sensor device is designed as part of the engine controller of the motor vehicle. Usually, an engine controller already has sensors, by means of which a backward rotation of parts of the drivetrain can be detected or identified. Alternatively, the engine controller can easily be connected to any sensors making possible such a detection. The necessary data for operating the protection device is thus usually already on hand in an engine controller. Therefore, by designing the sensor device as part of the engine controller, the protection device can be especially cost-favorable.

In another advantageous embodiment of the protection device, it is provided that the control device comprises an interface with a brake controller, by means of which the brake system of the motor vehicle is actuatable. In this way, it is immediately possible to control the brake system by means of the control device of the protection device. In particular, it may be provided that the control device is designed as part of the engine controller of the motor vehicle and that the engine controller now has a corresponding interface by means of which the engine controller can also actuate the brake system of the motor vehicle. In this way, the protection device can be integrated especially economically and easily in the motor vehicle.

In another advantageous embodiment of the protection device according to the invention, it is provided that the predetermined maximum speed is less than or equal to 5 km/h, especially less than or equal to 3 km/h. At such a slow speed, one can prevent especially reliably the occurrence of unwanted hydraulic effects or hydrodynamic effects in the hydraulic converter, and thus prevent an abrupt rise in force of a force feedback from the wheels to the rest of the drivetrain during a rolling movement counter to the selected direction of travel. At the same time, a driver can control the motor vehicle especially easily at such a slow rolling speed counter to the selected direction of travel. Thus, for example, the driver can especially easily avoid obstacles and/or institute an additional braking maneuver in good time, for example during an unwanted backward rolling on a slope. In particular, the rolling speed is thus less than or equal to a walking speed or running speed, so that pedestrians can also get out of the way of the motor vehicle with no problem.

In another advantageous embodiment of the protection device it is provided that the hydraulic converter is designed as a hydraulic torque converter. A hydraulic torque converter enables an especially smooth starting of the motor vehicle for the automatic transmission. However, special hydrodynamic effects can occur very rapidly in a hydraulic torque converter during a rolling movement counter to the selected direction of travel. Yet this is reliably prevented by the protection device. The hydraulic torque converter, for example, can also be called a hydrodynamic torque converter and it may be designed for example as a Trilok converter.

A second aspect of the invention relates to a motor vehicle. According to the invention, it is provided that the motor vehicle is outfitted with a protection device according to the first aspect of the invention. This can especially reliably prevent a damaging of the drivetrain. The features and benefits of using the protection device according to the first aspect of the invention will be found in the descriptions of the first aspect of the invention, where advantageous embodiments of the first aspect of the invention should be seen as advantageous embodiments of the second aspect of the invention, and vice versa.

A third aspect of the invention relates to a method for operating a motor vehicle having an engine, a brake system and an automatic transmission, which comprises at least one hydraulic converter. In this method, a rolling movement of the motor vehicle counter to the selected direction of travel of an engaged gearspeed of the automatic transmission is detected. According to the invention, it is provided that the brake system is actuated as a function of the detected rolling movement such that a rolling speed of the motor vehicle counter to the selected direction of travel is limited to a maximum speed. In this way, a damaging of the drivetrain of the motor vehicle can be reliably prevented during a rolling movement counter to the selected direction of travel of an engaged gearspeed of the automatic transmission.

Preferably, the motor vehicle comprises a protection device according to the first aspect of the invention and/or is designed as a motor vehicle according to the second aspect of the invention. The features and benefits of using the protection device according to the first aspect of the invention or from using the motor vehicle according to the second aspect of the invention will be found in the descriptions of the first aspect of the invention or of the second aspect of the invention, where the advantageous embodiments of the first or second aspect of the invention should be seen as advantageous embodiments of the third aspect of the invention, and vice versa.

In another advantageous embodiment of the method, it is provided that a first maximum speed is predetermined for a rolling movement counter to a selected forward direction of travel, and a second maximum speed is predetermined for a rolling movement counter to a selected backward direction of travel. In other words, a first maximum speed is specified for a backward rolling movement during an engaged forward gearspeed, such as the gear D of the automatic transmission. Furthermore, a second maximum speed is specified for a forward rolling movement during an engaged reverse gear, which can also be designated as the gear R, for example. In this way, one can take into account the circumstance that the automatic transmission here has different transmission ratios, whereby hydraulic effects may also occur in the hydraulic converter or damage to the drivetrain may occur at different speeds. For example, the maximum speed during a forward rolling movement may be less than the maximum speed during a backward rolling movement in order to especially well protect the drivetrain.

In another advantageous embodiment of the method, it is provided that the rolling speed of the motor vehicle is limited to a maximum speed at which a rotational speed of a turbine wheel of the hydraulic converter, which is generated by the rolling movement counter to the selected direction of travel, comprises a predetermined maximum difference and/or a predetermined minimum difference from a rotational speed, which is generated by the engine at a pump wheel of the hydraulic converter. Thus, a kind of adaptive maximum speed is set in this way, which takes into account the actual conditions in the hydraulic converter so as to avoid an abrupt increase in the torque transmission from the wheels to the engine. In this way, the drivetrain of the motor vehicle can be especially well protected.

For example, the driver of the motor vehicle can activate the gas pedal of the motor vehicle even during backward rolling, by which the rotational speed of the engine is increased at first and then also the speed of the pump wheel of the hydraulic converter. However, the increased engine power due to the activating of the gas pedal may still not be enough to hold the motor vehicle on a slope, or to limit the rolling movement counter to the selected direction of travel to an adequate speed in order to prevent damage to the drivetrain. Thus, the increased rotational speed of the pump wheel can be taken into account by the protection device.

Likewise, for example, the automatic transmission may have selected different forward gearspeeds. For example, the automatic selection gearspeeds of the automatic transmission may be manually limited to certain gearspeeds. Likewise, the selected gearspeed of the automatic transmission may also be entirely manually set in many motor vehicle models. The engaged transmission ratio or the engaged gearspeed of the automatic transmission may likewise have an influence on the speed which the drivetrain needs to be protected against. In other words, therefore, the maximum speed can also be selected as a function of the particular gearspeed engaged. For example, the respective rotational speeds of the turbine wheel and the pump wheel of the hydraulic converter may likewise be detected, for example, by means of the sensor device. In particular, one can avoid in this way an output rotational speed of the engine coming close to a rotational speed induced by the rolling movement at the output of the hydraulic converter. Thus, for example, one can reliably avoid hydraulic effects in the torque converter so that a killing of the engine can be prevented.

Further benefits, features and details of the invention will emerge from the following description of preferred exemplary embodiments as well as with the aid of the drawing. The features and combinations of features mentioned above in the description as well as the features and combinations of features mentioned below in the description of the figures and/or in the figures alone may be used not only in the particular indicated combination, but also in other combinations or standing alone, without leaving the scope of the invention.

BRIEF DESCRIPTION OF THE DRAWINGS

The FIG. 1 shows in a schematic side view a motor vehicle that is located on a steep slope and that is outfitted with a protection device for its drivetrain.

DETAILED DESCRIPTION

The FIG. shows in a schematic side view a motor vehicle 10 with a drivetrain 12. This drivetrain 12 comprises an engine 14, which is designed, for example, as an internal combustion engine or an e-machine. Force can be transferred from this engine 14 via an automatic transmission 16 to respective wheels 24 of the motor vehicle 10. The automatic transmission 16 comprises a hydraulic converter 18, which is designed, for example, as a Trilok converter. The hydraulic converter 18 comprises a pump wheel 20 driven by the engine 14 and a turbine wheel 22, by means of which respective wheels 24 of the motor vehicle 10 can be driven. The pump wheel 20 and the turbine wheel 22 are coupled hydraulically by means of a fluid in the hydraulic converter 18 for the force transmission. The hydraulic converter 18, in particular, facilitates a starting of the motor vehicle 10 with the lowest possible load on the drivetrain 12.

The motor vehicle 10 is standing on a slope, indicated in the FIG. by the angle 26. The normal forward direction of travel of the motor vehicle 10 is illustrated by arrow 28. For example, a forward gear has been engaged in the automatic transmission 16 as the gearspeed, so that a selected direction of travel corresponds to the arrow 28. Because of the slope of the ground beneath the motor vehicle 10, however, a rolling movement of the motor vehicle 10 counter to the selected direction of travel is produced. This rolling movement counter to the selected direction of travel is illustrated in the FIG. by the arrow 30. The slope is so great that the motor vehicle 10 cannot be held in place on the slope by a standing torque from the engine 14 operating at idle speed.

Accordingly, a rolling movement of the motor vehicle 10 counter to the selected direction of travel will occur. The wheels 24 induce a contrary rotational movement in the turbine wheel 22 of the hydraulic converter 18. As the rotational speed of the turbine wheel 22 approaches a rotational speed of the pump wheel 20, hydraulic effects may occur, which bring about a sharp increase in torque on the pump wheel 20. A greater torque is suddenly transmitted from the turbine wheel 22 to the pump wheel 20. This may result in an abrupt and sudden killing of the engine 14. In particular, the rolling movement counter to the selected direction of travel may produce in the drivetrain 12 a rotation of the moving parts contrary to the selected direction of travel, so that both the automatic transmission 16 and the engine 14 might become damaged. At the same time, such a killing of the engine 14 also constitutes an undesirable behavior of the motor vehicle 10 and may result in an even faster, especially an uncontrolled, backward rolling of the motor vehicle 10.

However, the motor vehicle 10 comprises a protection device 32 for the drivetrain 12. This protection device 32 comprises a sensor device 34 and a control device 36. The sensor device 34 is designed to detect a rolling movement of the motor vehicle 10 counter to the selected direction of travel of the engaged gearspeed of the automatic transmission 16. The control device 36 is designed to control a brake system 38 of the motor vehicle 10 as a function of the detected rolling movement, in order to limit a rolling speed of the motor vehicle 10 counter to the selected direction of travel to a maximum speed. The brake system 38 here comprises the usual driving brakes of the motor vehicle 10 and can reduce the rolling movement of the motor vehicle 10 by braking the wheels 24.

In this way, the rolling speed of the motor vehicle 10 counter to the selected direction of travel can be limited to a speed at which no damage will occur to the drivetrain 12, and especially no killing of the engine 14 will occur. This does not require any complicated sensor system to detect a halting of the motor vehicle 10. In particular, the motor vehicle 10 does not have to be brought to a complete halt by the driver in order for the protection device 32 to be activated. A standard hill-hold device, for example, requires a motor vehicle to be brought to a complete standstill in order for such a system to hold the motor vehicle on a hill. Furthermore, the brake system 38 is designed to be able to brake the motor vehicle 10 with no unnecessary wear and tear. On the other hand, a braking by means of the automatic transmission 16 would cause wear and tear on a part of the motor vehicle 10 that can only be serviced in costly manner.

The protection device 32 may be designed as an engine controller of the motor vehicle 10. An engine controller of a motor vehicle often already monitors both the speed of the motor vehicle 10 and the rotational speed of the respective parts of the drivetrain 12. Hence, no additional sensors are needed for the sensor device 34. In particular, the protection device 32 may be implemented as a special functionality of a down-hill assist. A down-hill assist for example regulates the speed during the descent of a hill—i.e., in the direction of arrow 30 in the FIG.—to a predeterminable speed by means of the brake system. In this way, for example, the vehicle descends a hill at a constant 50 km/h* without driver involvement.

The control device 36 may correspondingly be part of the engine control system. Then there is only required an interface 40 with the brake system 38 or with a brake controller in order to control the brake system 38 accordingly. In particular, the protection device 32 is implemented in the engine controller, since the engine 14 has the greatest need for protection in the drivetrain 12.

The protection device 32 or the sensor device 34 can also monitor respective rotational speeds of the turbine wheel 22 and the pump wheel 20. Then, as a function of these rotational speeds, the brake system 38 can likewise be controlled in order to limit the rolling speed of the motor vehicle 10 counter to the selected direction of travel to an adaptive maximum speed. The rotational speed difference between the turbine wheel 22 and the pump wheel 20 will be taken into account in order to avoid the above-described hydraulic effects that may result in damaging the drivetrain 12. In this way, the protection device 32 works especially reliably.

Here as well, an implementation of the protection device 32 in the engine controller is especially attractive, since the engine controller is already able to monitor the rotational speeds of the pump wheel 20 and the turbine wheel 22.

In motor vehicles of the prior art, on steep slopes, the propulsion built up by a hydraulic converter is not enough for starting with an automatic transmission. Furthermore, when a driving brake is released, the motor vehicle may be placed in motion on the hill counter to the engaged gearspeed. For such a motor vehicle in this operating condition, if the downhill speed—depending on the transmission ratio of the automatic transmission—exceeds a speed of 6-12 km/h, for example, the output rotational speed of the engine will approach the output rotational speed at the output of the hydraulic converter. This will produce a hydraulic effect of the torque converter, which suddenly reduces the rotational speed of the engine and thus kills the engine, or turns it in reverse. The same behavior may occur when rolling on a steep incline with reverse gear engaged.

The abrupt killing of the propulsion may produce a highly uncomfortable lurching of the motor vehicle. A reverse rotating of the engine may result in further damage to the components involved, i.e., especially in the engine and the torque converter. In addition, usually the transmission is damaged, or there is an automatic shifting to a neutral gear in order to protect the parts. This may result in the motor vehicle rolling even significantly faster counter to the selected direction of travel, since no starting torque is acting any longer. In addition, the driver must first activate the brake and engage a gearspeed in order to drive away once more.

By means of the protection device 32, the motor vehicle 10 is braked if it is recognizably placed in movement counter to the selected direction of travel. For example, the brake system 38 will be automatically activated if the motor vehicle 10 is moving counter to the desired direction of travel by more than 3 km/h. The functionality that is activated by means of the protection device 32 is similar to a down-hill assist, which may already be present. A down-hill assist works similar to a cruise control. However, it does not regulate the gas of the engine 14 in order to maintain a particular speed, but instead also controls the brake system 38 to set the speed of the motor vehicle 10 at a particular speed during downhill travel. When such down-hill assists are available, the motor vehicle 10 thus only requires a corresponding software upgrade in order to implement the protection device 32. In this way, the protection device 32 can be implemented in a particularly cost-effective manner. By means of the protection device 32, the rolling movement of the motor vehicle 10 counter to the desired direction of travel is limited, for example, to a speed of at most 4 km/h.

As a result, thanks to the protection device 32, there is no longer any uncomfortable lurching or killing of the engine during a rolling of the motor vehicle 10 counter to the selected direction of travel. Furthermore, when the gas pedal is activated, one can drive off at once in the direction of travel, so no clutch parts or the like need to be adjusted in the automatic transmission 16.

The invention claimed is:

1. A protection device for a drivetrain of a motor vehicle having an engine, wheels, and an automatic transmission, comprising:
 a sensor device;
 a control device;
 a wheel brake system comprising driving brakes by which a rotational movement of the wheels of the vehicle is braked; and
 at least one hydraulic converter associated with the automatic transmission;
 wherein the sensor device detects a wheel rolling movement of the motor vehicle at at least a predetermined speed in a forward direction or in a rearward direction that is counter to the selected direction of travel of an engaged gearspeed of the automatic transmission, and wherein the control device controls the wheel brake system of the motor vehicle as a function of the detected wheel rolling movement, in order to limit a speed of the wheel rolling movement of the motor vehicle counter to the selected direction of travel to a maximum speed by braking the wheels of the motor vehicle such that the wheel rolling movement continues without exceeding the maximum speed; and
 wherein the speed of the wheel rolling movement of the motor vehicle is limited, by the wheel braking system braking the wheels of the vehicle, to the maximum speed, wherein, at the maximum speed, a rotational speed of a turbine wheel of the hydraulic converter, which is generated by the wheel rolling movement counter to the selected direction of travel, has a predetermined maximum difference and/or a predetermined minimum difference from a rotational speed generated by the engine at a pump wheel of the hydraulic converter.

2. The protection device as claimed in claim 1, wherein the sensor device is part of the engine controller of the motor vehicle.

3. The protection device as claimed in claim 1, wherein the control device comprises an interface with a wheel brake controller, by means of which the wheel brake system of the motor vehicle is actuatable.

4. The protection device as claimed in claim 1, wherein the predetermined maximum speed is less than or equal to 5 km/h.

5. The protection device as claimed in claim 1, wherein the hydraulic converter is a hydraulic torque converter.

6. A motor vehicle having a protection device as claimed in claim 1.

7. A method for operating a motor vehicle having an engine, wheels, a wheel brake system, and an automatic transmission, which comprises at least one hydraulic converter associated with the automatic transmission, comprising:
 detecting a wheel rolling movement of the motor vehicle at at least a predetermined speed in a forward direction or in a rearward direction that is counter to the selected direction of travel of an engaged gearspeed of the automatic transmission; and
 actuating the wheel brake system as a function of the detected wheel rolling movement such that a speed of the wheel rolling movement of the motor vehicle counter to the selected direction of travel is limited to a maximum speed by braking the wheels of the motor vehicle such that the wheel rolling movement continues without exceeding the maximum speed;
 wherein the speed of the wheel rolling movement of the motor vehicle is limited, by the wheel brake system braking the wheels of the vehicle, to the maximum speed, wherein, at the maximum speed, a rotational speed of a turbine wheel of the hydraulic converter, which is generated by the wheel rolling movement counter to the selected direction of travel, has a predetermined maximum difference and/or a predetermined minimum difference from a rotational speed generated by the engine at a pump wheel of the hydraulic converter.

8. The method as claimed in claim 7, wherein a first maximum speed is predetermined for a wheel rolling movement counter to a selected forward direction of travel, and a second maximum speed is predetermined for a wheel rolling movement counter to a selected backward direction of travel.

9. The protection device as claimed in claim 1, wherein the predetermined maximum speed is less than or equal to 3 km/h.

10. The protection device as claimed in claim 1, wherein the control device is part of an engine controller of the motor vehicle.

11. The protection device as claimed in claim 1, wherein the speed of the wheel rolling movement is limited to the maximum speed without regulating a speed of the engine of the motor vehicle.

12. The method as claimed in claim 7, wherein the speed of the wheel rolling movement is limited to the maximum speed without regulating a speed of the engine of the motor vehicle.

* * * * *